(12) United States Patent
Kaul

(10) Patent No.: US 8,137,024 B2
(45) Date of Patent: Mar. 20, 2012

(54) HYDROCARBON-ADSORBING POROUS PAVEMENT STRUCTURE

(75) Inventor: Joseph B. Kaul, Lakewood, CO (US)

(73) Assignee: Reynolds Presto Products Inc., Richmond, VA (US)

( * ) Notice: Subject to any disclaimer, the term of this patent is extended or adjusted under 35 U.S.C. 154(b) by 0 days.

(21) Appl. No.: 13/216,894

(22) Filed: Aug. 24, 2011

(65) Prior Publication Data

US 2012/0045280 A1    Feb. 23, 2012

Related U.S. Application Data

(60) Division of application No. 12/026,159, filed on Feb. 5, 2008, now Pat. No. 8,025,456, which is a continuation-in-part of application No. 11/851,714, filed on Sep. 7, 2007.

(51) Int. Cl.
    *E01C 11/00* (2006.01)
(52) U.S. Cl. ............................................. 404/31; 404/75
(58) Field of Classification Search .................. 404/17, 404/31, 72, 75
    See application file for complete search history.

(56) References Cited

U.S. PATENT DOCUMENTS

| | | |
|---|---|---|
| 3,577,893 A | 5/1971 | Towner |
| 3,690,227 A | 9/1972 | Welty et al. |
| 3,909,143 A | 9/1975 | Cushman |
| 3,958,891 A | 5/1976 | Eigenmann |
| 4,076,917 A | 2/1978 | Swift et al. |
| 4,797,026 A | 1/1989 | Webster |
| 5,106,227 A | 4/1992 | Ahmad et al. |
| 5,123,778 A | 6/1992 | Bohnhoff |
| 5,250,340 A | 10/1993 | Bohnhoff |
| 5,298,539 A | 3/1994 | Singh et al. |
| 5,788,407 A | 8/1998 | Hwang |
| 5,836,715 A | 11/1998 | Hendrix et al. |
| 5,848,856 A | 12/1998 | Bohnhoff |
| 5,891,938 A | 4/1999 | Williams |
| 6,206,607 B1 | 3/2001 | Medico et al. |
| 6,962,463 B2 | 11/2005 | Chen |
| 7,041,221 B2 | 5/2006 | Arnott |

(Continued)

FOREIGN PATENT DOCUMENTS

DE    651 167    10/1937

(Continued)

OTHER PUBLICATIONS

Saskatchewan Waste Reduction Council, "Alternate Uses for Glass," Saskatchewan Waste Reduction Council, http://www.saskwastereduction.ca/glass/alternate.html (accessed Mar. 6, 2008).

(Continued)

*Primary Examiner* — Gary S Hartmann
(74) *Attorney, Agent, or Firm* — Merchant & Gould, P.C.

(57) ABSTRACT

A water-pervious pavement structure comprising wearing course comprising a water-pervious combination of recycled glass and aggregate bound together with a flexible adhesive binder and held within a plurality of connected, open grid pockets; and a layer of unbound recycled glass disposed under the wearing course capable of adsorbing contacting hydrocarbons carried with water through the wearing course. In a preferred embodiment, the wearing course comprises about 30 wt. % to about 80 wt. % recycled glass and about 20 wt. % to about 70 wt. % aggregate bound together by a cured resin binder within the grid pockets.

5 Claims, 2 Drawing Sheets

U.S. PATENT DOCUMENTS

| | | |
|---|---|---|
| 7,168,884 B2 | 1/2007 | Hart et al. |
| 8,025,456 B2 * | 9/2011 | Kaul .............................. 404/27 |
| 2009/0067924 A1 * | 3/2009 | Kaul .............................. 404/17 |

FOREIGN PATENT DOCUMENTS

| | | |
|---|---|---|
| DE | 200 00 015 | 5/2000 |
| EP | 445578 | 9/1991 |
| EP | 583086 | 2/1994 |
| EP | 1 462 571 | 9/2004 |
| FR | 2 653 360 A1 | 4/1991 |
| FR | 2 791 692 | 10/2000 |
| JP | 2004-76527 | 3/2004 |
| WO | WO 98/29356 | 7/1998 |

OTHER PUBLICATIONS

International Search Report mailed Dec. 22, 2008.
International Search Report and Written Opinion mailed May 15, 2009.

* cited by examiner

HYDROCARBON-ADSORBING POROUS PAVEMENT STRUCTURE

CROSS-REFERENCE TO RELATED APPLICATIONS

This application is a divisional of application Ser. No. 12/026,159, filed Feb. 5, 2008, now U.S. Pat. No. 8,025,456 which is a continuation-in-part of application Ser. No. 11/851,714, filed Sep. 7, 2007, which applications are incorporated herein by reference in their entirety.

FIELD

A heavy-duty porous pavement structure made from a composite composition of recycled glass, aggregate and an adhesive binding agent. The glass/aggregate composite is reinforced with the use of a recycled grid containing open-top pockets in various depths, depending upon the load and intended application, for receiving the combination of recycled glass, aggregate and binder. In addition to being a strong and attractive parking lot surface, the glass, aggregate, binder composite works as an effective in-situ filter of hydrocarbons to prevent groundwater contamination beneath the porous pavement structure and promote aquifer recharge. The porous pavement structure also acts as a Stormwater detention basin, thereunder, capable of holding most 25 year storm events under the porous pavement structure.

BACKGROUND

Increased concern is being given to non-point source pollution which originates from automobile fluids leaked onto pavement, such as parking surfaces and subsequently carried by contaminated, surface heated rainwater into sensitive creeks and streams. Of additional concern is the increased amount of impermeable surfaces in urban areas which limit groundwater infiltration and increase velocities of runoff, thereby damaging under-sized storm water conveyance infrastructure. Also of concern is the steady increase in non-porous black asphalt parking surfaces which increase air temperatures and add to global warming.

The present invention relates to a high strength porous pavement structure that actively filters out hydrocarbon pollutants from Stormwater, and is capable of holding the filtered water in a lower layer of recycled glass. Water carrying hydrocarbons that penetrates an upper wearing course flows into a hydrocarbon-adsorbent recycled glass layer (filtration/water storage layer).

Current technology in porous pavements is limited to using mostly virgin construction materials and does not actively filter hydrocarbons from the Stormwater prior to entering the underground aquifers. While the EPA encourages the use of porous pavements in their 1999 EPA fact sheet 11, "Porous Pavements", they express concern of using the current technology over aquifers due to potential risk of contamination from oil and grease that can be leaked from vehicles. The present invention defuses this concern by providing a porous pavement composition and structure that is able to remove hydrocarbons from water that passes therethrough so that underlying aquifer water quality is maintained.

The present invention utilizes recycled glass which is abundantly recycled, but has few commercial uses, diverting large volumes of glass from landfills. The recycled glass when mixed with aggregate and binder, creates a strong, attractive parking surface. The recycled glass actively adsorbs hydrocarbons while removing said hydrocarbons from polluted Stormwater before it enters underground aquifers. In addition to this environmental benefit, the porous parking surface will reduce flooding and promote groundwater recharge and allow for more efficient use of urban parking areas. The reflective nature of glass will also help keep the parking surface cool, reducing the urban heat island effect.

Increased water quality awareness and desire to use Green building materials make the glass, aggregate and binder composite composition unique and attractive to environmentally conscious builders. Many state and federal governments are requiring the use of building products that offer Leadership in Energy and Environmental Design (LEED) points as regulated by the United States Green Building Council (USGBC) on municipal building projects. The present invention will rate higher in LEED points than any current porous pavement technology allowing architects and owners to achieve Gold and Platinum LEED standards more easily.

SUMMARY

An upper porous pavement composition layer, also called the "wearing course", and a base layer of recycled glass thereunder, hereinafter called the "filtration/water storage layer" together are herein called the "pavement structure". The wearing course layer comprises about 30 wt. % to about 80 wt. % recycled glass; about 20 wt. % to about 70 wt. % aggregate; and about 0.2 ounce to about 5 ounces of adhesive binder per ft$^2$ of wearing course surface area. The filtration/water storage layer, disposed under the wearing layer, should be more than 80% recycled glass, preferably 100% recycled glass and optionally contains less that 20 wt. % filler, such as aggregate. The filtration/water storage layer comprises recycled glass that is not coated with binder so that it adsorbs oil and other hydrocarbons that pass through the wearing course with rain water.

A primary aspect of the present invention is to provide a porous pavement structure formed from a readily available, strong and inert recycled glass material in combination with an aggregate, such as chip seal aggregate, and a binder to form an upper wearing course portion of a porous pavement structure, and a layer of unbound recycled glass, disposed directly below the wearing course, that actively filters hydrocarbon pollutants from Stormwater that passes through the wearing course.

Another aspect of the present invention is to create a light reflecting, cool temperature parking surface to counteract the urban heat island effect. Another benefit is that the porous pavement structure described herein can be disposed over an underground Stormwater detention basin since any hydrocarbon leakage from the vehicles through the porous pavement structure will be adsorbed by the unbound recycled glass portion of the pavement structure during penetration of storm water.

DETAILED DESCRIPTION OF THE PREFERRED EMBODIMENT

Figure 1:
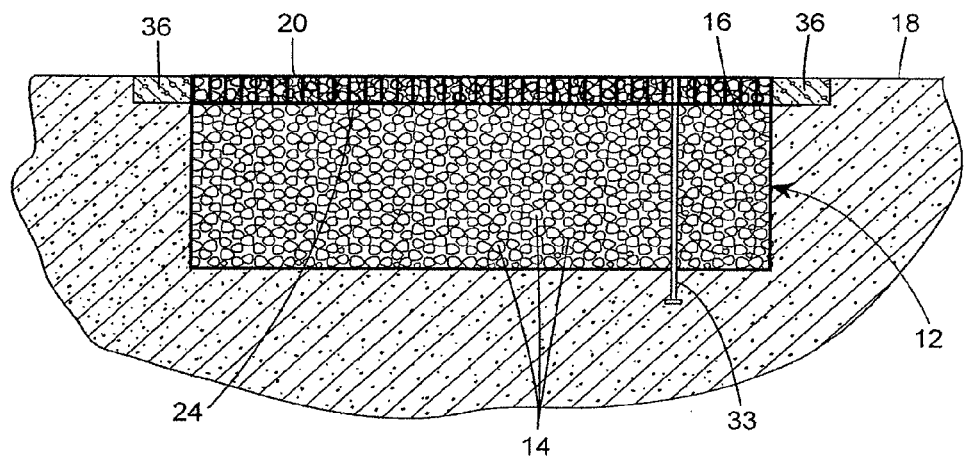
FIG. 1 is a cross sectional view of a porous pavement structure, taken along the line 1-1 of FIG. 2, including a lower layer of unbound recycled glass (filtration/water storage layer) that is overlaid by a porous pavement composite composition that fills a geosynthetic grid structure (wearing course) showing the grid structure anchored to the prepared subgrade with an anchor, such as rebar, extending through the filtration/water storage layer.
Figure 2:
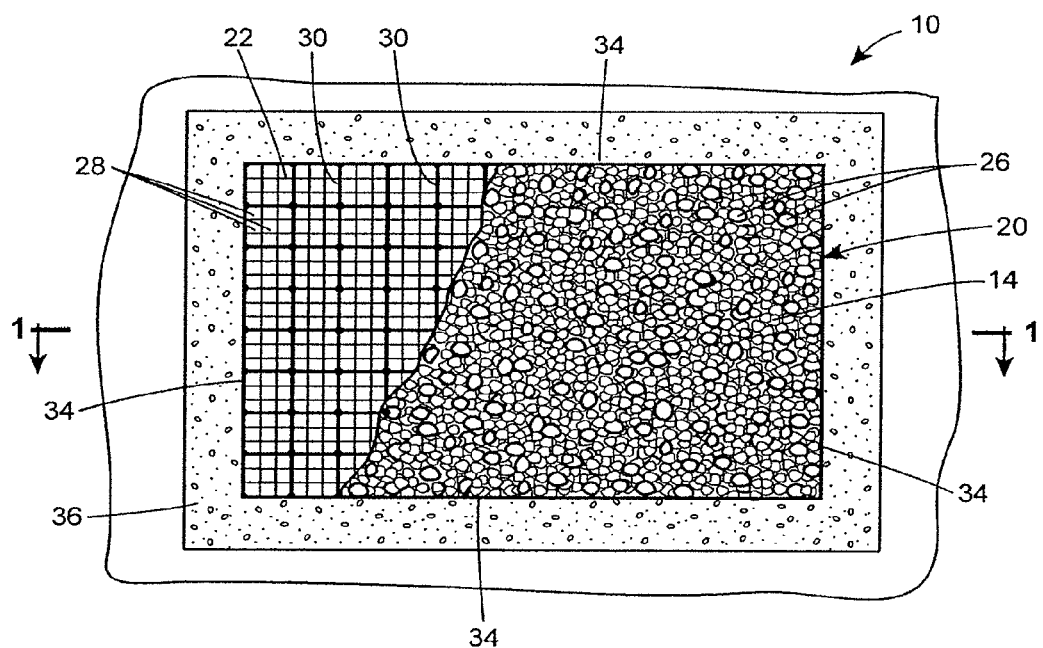
FIG. 2 is a partially broken-away top view of the porous pavement structure of FIG. 1.
Figure 3:
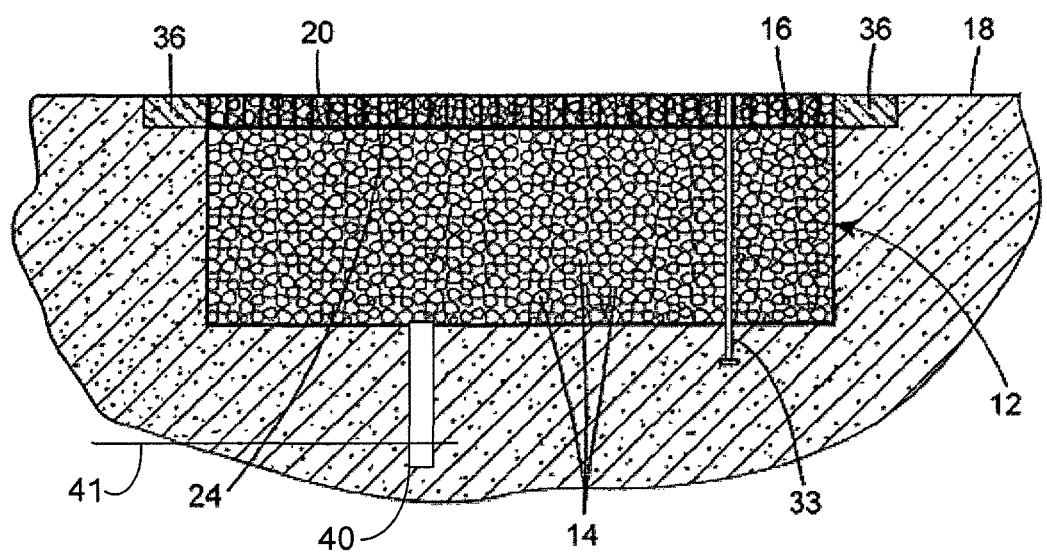
FIG. 3 is a schematic of the pavement structure of FIG. 1 showing a caisson beneath the pavement structure.

The preferred porous pavement structure described herein includes an upper wearing course comprising about 30 wt. % to about 80 wt. % recycled glass; about 20 wt. % to about 70 wt. % aggregate; and about 2 wt. % to about 6 wt. % of adhesive binder. Preferably, the wearing course includes about 50 wt. % to about 70 wt. % recycled glass; about 30 wt. % to about 50 wt. % aggregate; and about 3 wt. % to about 5 wt. % of binder, preferably a flexible polyurethane binder.

The recycled glass/aggregate/binder composite of the wearing course should have the recycled glass and aggregate homogeneously mixed such that there is a surface percentage of recycled glass and surface percentage of aggregate that is within about 10 wt. % of the overall percentage of recycled glass and aggregate that forms the wearing course. In the preferred embodiment, the wearing course has a compressive strength of at least about 800 psi, more preferably at least about 900 psi.

The wearing course is provided with sufficient strength and stability for years of structural integrity by disposing the recycled glass/aggregate/binder composition in a metal, ceramic, or polymeric grid structure, such as that described in Bohnhoff U.S. Pat. No. 5,250,340, hereby incorporated by reference. Other suitable grid structures are available and are useful having depths of about 1 inch to about 10 inches. Preferred grid structures include interconnected pockets or grids having shaped reservoirs that are open at their upper surfaces for receiving the recycled glass/aggregate/binder composition, and are liquid-porous at their bottom surfaces, but include structure, such as an underlying water-pervious felt or mat (woven or non-woven) layer, or contain horizontal bottom cross or grid structure that will retain the recycled glass/aggregate/binder composition within the pockets. Alternatively, a separate mesh, e.g., metal or plastic, preferably plastic, can be disposed under the grid structure pockets. The grids or pockets that are filled with the wearing course composition preferably should have dimensions (in any shape) that measure about 1 in$^2$ to about 30 in$^2$ (regardless of depth), e.g., 3 inch by 3 inch squares, in their open top surface area to provide sufficient strength and stability to the wearing course composition.

The recycled glass is glass that has been crushed, tumbled and heated to round its edges and remove non-glass impurities. A suitable recycled glass is described in Arnott U.S. Pat. No. 7,041,221, which is hereby incorporated by reference. Waste glass is prepared by crushing the glass to desired dimensions, e.g., above 200 mesh, U.S. Seive Series, to about 2 inches in diameter, preferably about ¼ inch to about ½ inch, more preferably about ⅜ inch.

The glass may be crushed using an impact crusher, hammer mill, cone crusher or a roller crusher. Preferably, the recyclable glass is crushed using roller crusher. Inventor has further observed that better oil adsorption occurs when the glass is crushed using a roller crusher.

Any order of pre-crushing, pre-screening, crushing, cleaning and drying may be used. In a preferred embodiment however, the crushed glass is first pre-crushed and pre-screened. If the glass is clean, no pre-crushing or pre-screening is required. The pre-crushed glass is pre screened through a mesh, which may include an inch mesh, a combination of double or triple deck screens or at least two meshes. Once pre-screened through the mesh, preferably the glass is further crushed using a roller crusher and subsequently, the crushed glass is dried, after cleaning, preferably at a temperature of at least 100° F. or, more preferably, at a temperature of at least 350° F. Subsequently, the crushed glass is screened, preferably through at least a 40 mesh screen, or more preferably through a 30 mesh screen, or most preferably through a 20 mesh screen.

The crushed, screened and heated recycled glass is washed prior to applying the binder to its surfaces in forming the wearing course of the pavement structure. The binder preferably is applied to an upper surface of the wearing course after filling a grid structure with the mixture or recycled glass and aggregate that is disposed over a filtration/water storage layer of clean recycled glass that contains no binder or other coating material. The binder preferably is applied to the surface of the recycled glass/aggregate wearing course by spraying, but any other method, e.g., pouring binder over the upper surface of the wearing course also is effective to provide sufficient binding of contacting or closely adjacent glass and aggregate binding surfaces to bind the recycled glass to contacting or closely adjacent aggregate and/or other glass particles. Alternatively, the glass and aggregate can be mixed together and the binder applied to the mixture, prior to filling the grid pockets, or the binder can be applied only to the aggregate prior to mixing the recycled glass and aggregate.

One hypothetical wearing course composition includes 60 wt. % recycled glass and 40 wt. % aggregate in a plastic (polymeric grate) having adjacent pockets having a 9.0 in$^2$ horizontal cross-sectional area (3 inch by 3 inch squares) and a depth of 2 inches, using a flexible polyurethane resin (ELASTOTRAK 62001T from BASF—a diphenylmethane—4,4'-diisocyanate/polymeric diphenylmethane-4,4'-diisocyanate polyurethane from BASF) at 3-6% the total weight of aggregate and glass (mixed by tumbling the glass, aggregate and resin in a paddle, drum or screw auger mixer. An underlying filtration/water storage layer of recycled glass retains maximum hydrocarbon adsorbency since it contains essentially no binder.

In accordance with another important embodiment, a "thermal moderating effect" on the pavement surface is achieved by excavating the soil to below the frost line. This thermal moderating effect cools the pavement surface in the summer and warms the surface in the winter aiding to melt surface ice and snow. The soil excavation below the frost line 41 can be accomplished under the entire pavement area (at great expense) or can be accomplished by drilling 2 inch to 12 inch diameter caissons 40 to a depth of at least 12 inches below the frost line 41 depth at spaced locations under the base (e.g., at 4 foot intervals under the entire base of the pavement structure). The holes or caissons 40 can be filled with an air-permeable material, such as one inch squares of polymeric foam material, that will allow air from below the frost line to rise through the caissons and enter the base material, thereby providing the above-described thermal moderating effect to the pavement surface.

Adhesive Binders

Any known flexible polymeric binder is suitable for binding the recycled glass to the aggregate to manufacture the wearing course composition described herein. Suitable adhesive resin binders including polyurethane; epoxy binders, e.g., Bisphenol A and Bisphenol F based epoxies; phenoxy resins; polyester resins; vinyl ester resins; phenolic resins; novolac resins; phenol/novolac resins; polyamide, e.g., nylon resins; and the like. The flexible (elastomeric) polyurethane resins are preferred since they have the highest adhesion values under extensive loads, e.g., vehicles in parking lots.

The preferred elastomeric polyurethane is BASF ELASTOTRAK 62001T isocyanate that is a combination of 38 wt. % CAS Number 101-68-8 and about 60 wt. % CAS Number 9016-87-9 with less than 3 wt. % mixed isomers of CAS Number 101-68-8 and less than 2% isocyanate prepolymers.

Other useful polyurethanes include the reaction product of any of the following aliphatic or aromatic diisocyanates with one or more of the following dialcohols and cross-linking agents, wherein the cross-linking agent is used in an amount that results in a flexible (elastomeric) polyurethane having an elongation at break of at least about 50% preferably at least about 100%, more preferably at least about 200%, and not a rigid polyurethane:

| diisocyanate |
| --- |
| 1,2-ethylene diisocyanate; |
| 1,6-hexylene diisocyanate; |
| lysine diisocyanate; |
| bis(2-isocyanatoethyl) fumarate; |
| 1,4-cyclohexylene diisocyanate; |
| methylcyclohexylene diisocyanate; |
| 2,2,4-trimethyl-1,6-hexylene diisocyanate; |
| 2,6-tolylene diisocyanate; |
| 4,4'-diisocyanatodiphenyl ether; |
| 4,4'-diisocyanatodiphenylmethane; |
| 3,3'-dichloro-4,4'-diisocyanatodiphenylmethane; |
| 4,4'-diphenyl diisocyanate; |
| 4,4'-diisocyanatodiphenyl; |
| 3,3'-dimethyl-4,4'-diisocyanatodiphenyl; |
| 2,2'-dimethyl-4,4'-diisocyanatodiphenyl; |
| 3,3'-dimethoxy-4,4'-diisocyanatodiphenyl; |
| 2,2'-dichloro-5,5'-dimethoxy-4,4'-diisocyanatodiphenyl; |
| 3,3'-dichloro-4,4'-diisocyanatodiphenyl; |
| 1,3-diisocyanatobenzene; |
| 1,4-diisocyanatobenzene; |
| 1,2-naphthylene diisocyanate; |
| 4-chloro-1,2-naphthylene diisocyanate; |
| 4-methyl-1,2-naphthylene diisocyanate; |
| 1,3-naphthylene diisocyanate; |
| 1,4-naphthylene diisocyanate; |
| 1,5-naphthylene diisocyanate; |
| 1,6-naphthylene diisocyanate; |
| 1,7-naphthylene diisocyanate; |
| 1,8-naphthylene diisocyanate; |
| 4-chloro-1,8-naphthylene diisocyanate; |
| 2,3-naphthylene diisocyanate; |
| 2,7-naphthylene diisocyanate; |
| 1,8-dinitro-2,7-naphthylene diisocyanate; |
| 1-methyl-2,4-naphthylene diisocyanate; |
| 1-methyl-5,7-naphthylene diisocyanate; |
| 6-methyl-1,3-naphthylene diisocyanate |
| and 7-methyl-1,3-naphthylene diisocyanate. |
| p-phenylene diisocyanate; |
| toluene diisocyanate; |
| 4,4'-methylenebis-(phenylisocyanate); |
| polymethylene polyphenyl isocyanate; |
| bitolylene diisocyanate; |
| m-tetramethyl-xylylene; |
| hexamethylene diisocyanate; |
| 1,6-diisocyanato-2,2,4-tetra-methylhexane; |
| 1,6-diisocyanato-2,4,4-trimethyl-hexane; |
| trans-cyclohexane-1,4-diisocyanate; |
| 1,3-bis(isocyanato-methyl)cyclohexane; |
| 3-isocyanato-methyl-3,5,5-trimethylcyclo-hexyl isocyanate; |
| dicyclohexylmethane diisocyanate |
| Polyols |
| ethylene glycol |
| propylene glycol |
| trimethylolpropane |
| trimethylolethane |
| 1,2-propanediol |
| 1,4-butanediol |

-continued

| |
| --- |
| diethylene glycol |
| polyoxypropylene triols |
| dihydroxy polyethers |
| trihydroxy polyethers |
| poly (tetramethylene glycol) |
| poly (ethylene glycol) |
| poly (propylene glycol) |
| pentaerythritol |
| poly (caprolactone diol) |
| polyether/polyester polyo/hybrids |
| polyester diols extended with propylene oxide; |
| polyether triols |
| cross-linkinq agents |
| ethylene diamine, |
| diethylene, triamine, |
| n methyl ethylene diamine, trimethylpropane, |
| trimethylolethane, |
| glyceraol, |
| 1,2,6-hexane triol, |
| cyclopentane-tetracarboxylic acid, |
| 1,3,5-benzene tricarboxylic acid, |
| citric acid, |
| trimethylolpropane tris(β-mercaptopropionate) and |
| pentaerythritol tetrakis(β mercaptopropionate, |
| triethylenetetramine, |
| tetraethylenepentamine, |
| polyethyleneimine, |
| pentaerythritol, |
| tolylene-2,4,6-triamine, |
| amino-ethanol, |
| trimethylenediamine, |
| tetramethylenediamine, |
| pentamethylenediamine, |
| hexamethylenediamine, |
| ethanolamine, |
| diethanolamine, |
| hydrazine, |
| triethanolamine, |
| benzene-1,2,4-tricarboxylic acid, |
| nitrilotriacetic acid |
| 4,4'-methylenebis(o-chloroaniline) |

Examples of other suitable adhesive resins include: binders comprising carboxylic acid and anhydride polymers and β-hydroxyalkylamides as crosslinkers. The molar ratio of carboxyl groups to hydroxyl groups is preferably 1:1. Examples are described in U.S. Pat. No. 4,076,917, incorporated herein by reference. Other suitable adhesive binders are mixtures of high molecular weight polycarboxylic acids and polyhydric alcohols, alkanolamines or polyacid amines. Suitable high molecular weight polycarboxylic acids are polyacrylic acid, copolymers of methyl methacrylate/n-butyl acrylate/methacrylic acid and of methyl methacrylate/methacrylic acid. The polyhydric alcohols and alkanolamines include 2-hydroxymethyl-1,4-butanediol, trimethylolpropane, glycerol, poly(methylmethacrylate-co-hydroxypropyl acrylate), diethanolamine and triethanolamine. Maleic acid can be included as a possible comonomer for preparing the high molecular weight polycarboxylic acids. Additional examples of these adhesive binders are described in EP 445 578, incorporated herein by reference.

Suitable formaldehyde-free aqueous binders are described in EP 583 086, incorporated herein by reference. These binders require a phosphorus-containing reaction accelerant to provide adequate reinforcing fiber web strengths. The binders comprise a polycarboxylic acid having at least 2 carboxyl groups and optionally also anhydride groups. Polyacrylic acid is preferred, but copolymers of acrylic acid with maleic anhydride are also useful. The binder further comprises a polyol, for example glycerol, bis[N,N-di(β-hydroxyethyl) adipamide, pentaerythritol, diethylene glycol, ethylene glycol, gluconic acid, β-D-lactose, sucrose, polyvinyl alcohol, diisopropanolamine, 2-(2-aminoethylamino)ethanol, triethanolamine, tris(hydroxymethylamino)methane and diethanolamine. A phosphorus-containing reaction accelerant is omitable only if a highly reactive polyol is used such as β-HHHydroxyalkylamides.

Additional examples of useful adhesive binders include a condensation product of a methylene donor and a methylene acceptor, either pre-condensed, or condensed in-situ while in contact with the basalt particles. The term "methylene donor" is intended to mean a compound capable of reacting with a methylene acceptor (such as resorcinol or its equivalent containing a reactive hydroxyl group) and generate the resin outside of contact with the basalt particles, or in-situ. Preferably, the components of the condensation product include a methylene acceptor and a methylene donor. The most commonly employed methylene acceptor is a phenol, such as resorcinol, while the most commonly employed methylene donor is a melamine, such as N-(substituted oxymethyl) melamine. The effect achieved is resin formation in-situ while in contact with the basalt particles, creating a bond between the basalt particles, irrespective of whether the basalt particles have been pretreated with an additional adhesive, such as a polyepoxides or the like. Examples of other methylene donors which are suitable for use in the basalt powder compositions described herein include melamine, hexamethylenetetramine, hexaethoxymethylmelaniine, hexamethoxymethylmelamine, lauryloxymethyl-pyridinium chloride, ethoxy-methylpyridinium chloride, trioxan hexamethoxy-methylmelamine, the hydroxyl groups of which may be esterified or partly esterified, and polymers of formaldehyde, such as paraformaldehyde. In addition, the methylene donors may be N-substituted oxymethylmelamines, of the general formula:

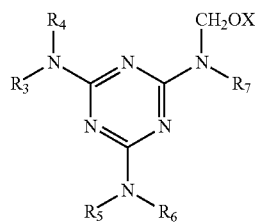

wherein X is an alkyl having from 1 to 8 carbon atoms $R^3$, $R^4$, $R^5$, $R^6$ and $R^7$ are individually selected from the group consisting of hydrogen, an alkyl having from 1 to 8 carbon atoms and the group —$CH_2OX$. Specific methylene donors include hexakis (methoxymethyl)melamine; N,N',N"trimethyl/N,N', N"-trimethylol-melamine; hexamethylolmelamine; N,N',N"-dimethylolmelamine; N-methylol-melamine; NN'-dimethylolmelamine; N,N',N"-tris(methoxymethyl)melamine; and N,N',N"-tributyl-N,N,N"-trimethylol-melamine. The N-methylol derivatives of melamine are prepared by known methods.

The amount of methylene donor and methylene acceptor, pre-condensed or condensed in-situ, that are present in the basalt powder composition may vary. Typically, the amount of pre-condensed methylene donor and methylene acceptor is present will range from about 0.1% to about 15.0%; or each can be added separately in an amount of about 0.1% to about 10.0%, based on the weight of basalt powder in the composition. Preferably, the amount of each of a methylene donor and methylene acceptor added for in-situ condensation ranges from about 2.0% to about 5.0%, based on the weight of basalt powder in the composition, to obtain the maximum basalt content for greater ballistic protection.

The weight ratio of methylene donor to the methylene acceptor may vary. Generally speaking, the weight ratio will range from about 1:10 to about 10:1. Preferably, the weight ratio ranges from about 1:3 to 3:1.

Resorcinol-free adhesive resins also are useful in the basalt compositions described herein. For example, U.S. Pat. No. 5,298,539, incorporated herein by reference, discloses at least one additive selected from the group consisting of derivatives of melamine, acetoguanamine, benzoguanamine, cyclohexylguanamine and glycoluril monomer and oligomers of these monomers. These derivatives are substituted on average at two or more positions on the monomer or each unit of the oligomer with vinyl terminated radicals and the composition is free of resorcinol.

Other resorcinol-free adhesive resins and adhesive compounds that are useful in the basalt compositions include those described in U.S. Pat. Nos. 5,891,938 and 5,298,539, both hereby incorporated by reference. The '938 patent discloses a self-condensing alkylated triazine resin having high imino and/or methylol functionality. U.S. Pat. No. 5,298,539 discloses substituted derivatives based on cyclic nitrogen compounds such as melamine, acetoguanamine, cyclohexylguanamine, benzoguanamine, and similar alkyl, aryl or aralkyl substituted melamines, glycoluril and oligomers of these compounds. In particular, the adhesive resins and adhesive compounds which are useful as the adhesive resins in the basalt compositions described herein include the following: adhesive resins selected from the group consisting of derivatives of melamine, acetoguanamie, benzoguanamine, cyclohexylguanamine and glycoluril monomers and oligomers of these monomers, which have been substituted on average at two or more positions on the monomer or on each unit of the oligomer with vinyl terminated radicals, the adhesive being free of resorcinol; and, these derivatives which have been further substituted on average at one or more positions with a radical which comprises carbamylmethyl or amidomethyl.

Further, the adhesive resin can be any of the compounds of the following formulas:

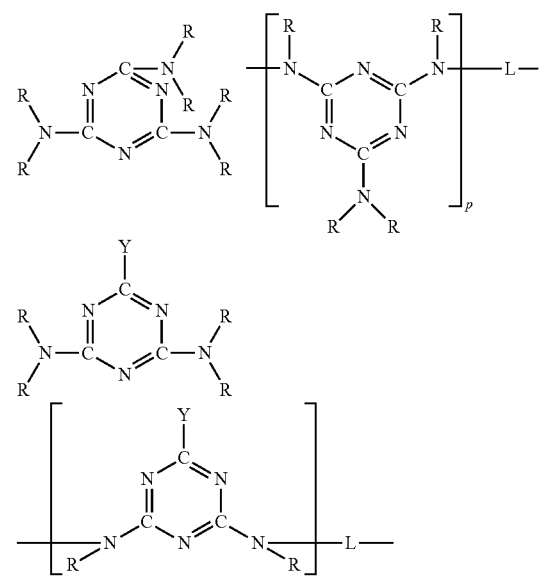

-continued

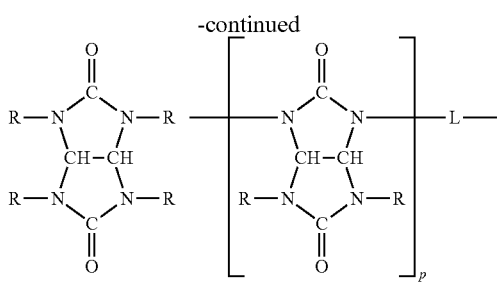

and positional isomers thereof,
wherein, in each monomer and in each polymerized unit of the oligomers, Y is selected from methyl, phenyl and cyclohexyl, and, on average,
at least two R are —CH$_2$—R$^1$,
and any remaining R are H, and
at least 2 R$^1$ are radicals selected from

CH$_2$=C(R$^2$)—C(O)—O—,

CH$_2$=C(R$^2$)—C(O)—Z,

CH$_2$=C(R$^2$)—C(O)—NH—, and

CH$_2$=C(R$^2$)—CH$_2$—O—, wherein R$^2$ is hydrogen or C$_1$-C$_{18}$ alkyl, and Z is a radical selected from

—O—CH$_2$—CH$_2$—O—,

—O—CH$_2$—CH(CH$_3$)—O—,

—O—CH$_2$—CH$_2$—CH$_2$O—, and

—O—CH(C$_2$H$_5$)—O—, and any remaining R$^1$ radicals are selected from

—O—R$^3$,

—NH—C(O)—OR$^4$, and

—NH—C(O)—R$^4$, and wherein R$_3$ is hydrogen or R$_4$, and
R$_4$ is a C$_1$-C$_{18}$ alkyl, alicyclic, hydroxyalkyl, alkoxyalkyl or aromatic radical, and in the oligomers,
P is 2 to about 10, and L is methylene or the radical

—CH$_2$—O—CH$_2$—.

These adhesive compounds are particularly useful, wherein on average at least one R$^1$ in each monomer or in each oligomerized unit is —NH—C(O)—OR$^4$, particularly the compounds of the following formulas:

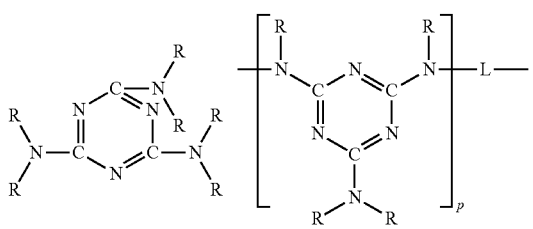

Other useful adhesive resins include the above formulas wherein on average, at least one R radical in each monomer or in each oligomerized unit is

—CH$_2$=NH—C(O)—OR$^4$, wherein R$^4$ is a C$_1$-C$_{18}$ alkyl, alicyclic, hydroxyalkyl, alkoxyalkyl or aromatic radical, and wherein, on average, at least two R radicals are selected from

CH$_2$=C(CH$_3$)—C(O)O—C$_3$H$_6$—O—CH$_2$— and

CH$_2$=CH$_2$—C(O)O—C$_2$H$_4$—O—CH$_2$— and at least one R radical is selected from

—CH$_2$=NH—C(O)—O—CH$_3$, and

—CH$_2$=NH—C(O)—O—C$_3$H$_7$.

These adhesive resins and compounds can include additional additives, particularly those selected from hydroxymethylated and alkoxymethylated (alkoxy having 1-5 carbon atoms) derivatives of melamine, acetoguanamine, benzoguanamine, cyclohexylguanamine and glycoluril and their oligomers.

Additional adhesive resins useful in the recycled glass/aggregate wearing couse compositions described herein include self-condensing alkylated triazine resins selected from the group consisting of (i), (ii), and (iii):

(i) a self-condensing alkylated triazine resin having at least one of imino or methylol functionality and represented by formula (I)

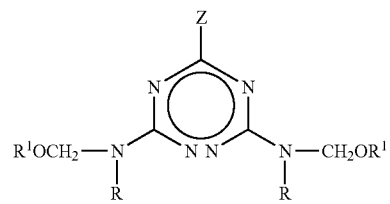

(ii) an oligomer of (i), or
(iii) a mixture of (i) and (ii), wherein
Z is —N(R)(CH$_2$OR$^1$), aryl having 6 to 10 carbon atoms, alkyl having 1 to 20 carbon atoms or an acetyl group,
each R is independently hydrogen or —CH$_2$OR$^1$, and
each R$^1$ is independently hydrogen or an alkyl group having 1 to 12 carbon atoms,
provided that at least one R is hydrogen or —CH$_2$OH and at least one R$^1$ is selected from the alkyl group; and
wherein the basalt powder-containing composition is substantially free of methylene acceptor coreactants.

These adhesive resins are particularly useful wherein at least one R group is hydrogen and/or wherein at least one R$^1$ group is a lower alkyl group having 1 to 6 carbon atoms, particularly where the adhesive resin is a derivative of melamine, benzoguanamine, cyclohexylguanamine, or acetoguanamine, or an oligomer thereof.

One particularly useful alkylated triazine adhesive resin of the above formula is wherein Z is —N(R)(CH2OR1).

The compositions containing an adhesive such as a cobalt salt of an organic acid, hydroxybenzoic acid, and resorcinol, also function to increase the adhesion between the basalt powder particles.

Another adhesive resin useful herein, is N-(substituted oxymethyl)melamine and at least one of α- or β-naphthol. This adhesive resin employs the monohydric phenols, α- or β-naphthol, as methylene acceptors in the resin forming reaction during vulcanization in the absence of resorcinol.

Another suitable class of adhesive resins useful herein to adhere the recycled glass and aggregate particles together, are those which are applied in multi-stage processes, for instance a blocked isocyanate being applied in combination with polyepoxide and the material then being treated using customary resorcinol-formaldehyde resins. Additional useful adhesive resins include, for example, a reaction product of triallyl cyanurate, resorcinol and formaldehyde or p-chlorophenol, resorcinol and formaldehyde.

Other suitable adhesive resins include polyurethane resins, phenol aldehyde resins, polyhydric phenol aldehyde resins, phenol furfural resins, xylene aldehyde resins, urea formaldehyde resins, melamine formaldehyde resins, alkyd resins, polyester resins, and the like.

Preferred Construction of Pavement Structure

Referring now to the drawings showing the porous pavement structure 10, the filtration/water storage lower layer 12 of recycled glass particles 14 is deposited in a defined, excavated area 16 in a soil surface 18 in a desired depth, e.g., 2 inches to about 30 inches, preferably about 12 inches, compacted to at least 90%, preferably at least 95% Modified Proctor (ASTM D1557) before applying the wearing course 20 thereover. Before laying the grid structure 22 on the recycled glass lower layer 12 (filtration/water storage layer), preferably a fabric or plastic mesh 24 is disposed over the recycled glass layer 12 to hold the recycled glass particles 14, aggregate particles 26 and binder composition of the wearing course 20 in place within the grid structure 22. The preferred grid structure is GEO-BLOCK® of Presto Products Company having a 2 inch height of individual, adjacent 3 inch by 3 inch rectangular pockets 28 of adjacent interlocking grid units 30 of semi-rigid high density polyethylene. The GEOBLOCK® grid units 30 then are interlocked together to create an integral holding structure for the recycled glass/aggregate/binder wearing course 20 composition forming an upper portion of the pavement structure 10 having the desired dimensions. Optionally, the grids 30 may be anchored to the soil with spaced anchors 33.

In accordance with a preferred embodiment, the wearing course 20, disposed over the filtration/water storage layer 12 of recycled glass particles 14, is supported at its edges 34 or perimeter with a structural border material, such as cement border 36, so that vehicle traffic on the wearing course 20 edges 34 does not force separation of the bound recycled glass/aggregate composition from the grid pockets 28 at the edges 34 of the pavement structure 10.

After the grid structure 22 is disposed over the plastic mesh or fabric 24, the grids 30 are filled with a homogeneous mixture of recycled glass particles 14 and aggregate particles 26 coated with a flexible polyurethane resin, preferably having a percent elongation at break of at least 50%, more preferably at least 100%, even more preferably at least 200%. The recycled glass, aggregate and resin are compacted in the grids 30, in individual, adjacent grid pockets 28. Sufficient adhesive binder is coated onto the recycled glass and aggregate to adhere all glass and aggregate particles together.

What is claimed:

1. A method of constructing a porous pavement structure capable of capturing hydrocarbon contaminants carried by rain water comprising:
   applying a layer of recycled glass over a soil surface;
   compacting the applied layer of recycled glass to a modified Proctor of at least 90%;
   applying a fabric or mesh over the compacted layer of recycled glass;
   applying a structure containing a plurality of open-top grid pockets having rigid or semi-rigid upwardly-extending vertical grid walls for receiving and holding a wearing course composition;
   filling the grid pockets with a wearing course composition comprising a mixture of recycled glass, aggregate and flexible resin binder; and
   curing the adhesive binder.

2. The method of claim 1, wherein the mixture of recycled glass and aggregate comprises about 30 wt. % to about 80 wt. % recycled glass and about 20 wt. % to about 70 wt. % aggregate.

3. The method of claim 1, wherein the adhesive binder is a resin binder applied in an amount in the range of about 2 wt. % to about 6 wt. %, based on the combined weight of recycled glass and aggregate.

4. The method of claim 1, wherein the layer of recycled glass is disposed over the soil surface and has a thickness and sufficient void space between recycled glass particles to provide a detention basin for storm water that penetrates the bound mixture of recycled glass and aggregate.

5. The method of claim 1, further including excavating said soil surface to a depth at least 12 inches below a frost line to achieve air communication from said excavated depth into the layer of recycled glass, thereby achieving a thermal moderating effect resulting from air rising from below the frost line into said layer of recycled glass.

* * * * *